(12) United States Patent
Zhao et al.

(10) Patent No.: US 7,925,045 B2
(45) Date of Patent: Apr. 12, 2011

(54) DETERMINING DOCUMENT AUTHENTICITY IN A CLOSED-LOOP PROCESS

(75) Inventors: Maria Qian Zhao, San Pablo, CA (US); Wei Ming, Cupertino, CA (US)

(73) Assignee: Konica Minolta Systems Laboratory, Inc., San Mateo, CA (US)

( * ) Notice: Subject to any disclaimer, the term of this patent is extended or adjusted under 35 U.S.C. 154(b) by 883 days.

(21) Appl. No.: 11/853,004

(22) Filed: Sep. 10, 2007

(65) Prior Publication Data
US 2009/0067666 A1    Mar. 12, 2009

(51) Int. Cl.
*G06K 9/00*    (2006.01)
*H04L 9/32*    (2006.01)

(52) U.S. Cl. .......................... 382/100; 382/274; 713/176

(58) Field of Classification Search .................. 382/100, 382/112, 113, 114, 115, 168, 175–176, 181–188, 382/232, 254, 255, 274, 305, 312, 318; 358/3.06; 713/176
See application file for complete search history.

(56) References Cited

U.S. PATENT DOCUMENTS

| | | | |
|---|---|---|---|
| 7,054,461 B2 * | 5/2006 | Zeller et al. | 382/100 |
| 7,142,689 B2 * | 11/2006 | Hayashi et al. | 382/100 |
| 7,286,685 B2 * | 10/2007 | Brunk et al. | 382/100 |
| 7,586,647 B2 * | 9/2009 | Wark et al. | 358/3.06 |
| 7,644,281 B2 * | 1/2010 | Deguillaume et al. | 713/176 |
| 2006/0023259 A1 | 2/2006 | Wark et al. | |
| 2006/0075241 A1 * | 4/2006 | Deguillaume et al. | 713/176 |

* cited by examiner

*Primary Examiner* — Seyed Azarian
(74) *Attorney, Agent, or Firm* — Chen Yoshimura LLP

(57) ABSTRACT

A document authentication method uses a watermark added in a printed document to detection possible alterations made to the document after it was printed. First, a visible watermark in the form of a dot pattern is overlapped with an original digital image. The watermarked image is printed out as a halftone image at a first resolution. The watermark in the printed document appears as a light gray shade. Later, the printed document is scanned back using a grayscale scan at a resolution higher than the first resolution. In the scanned image, altered areas would appear flat (lacking intensity variation) whereas unaltered areas will have relatively large density variations due to the watermark dots and the fact that the image was halftone printed at a lower resolution. Alternations are detected by identifying flat areas within the image using a combination of flat block detection and a multiple thresholds method.

11 Claims, 6 Drawing Sheets

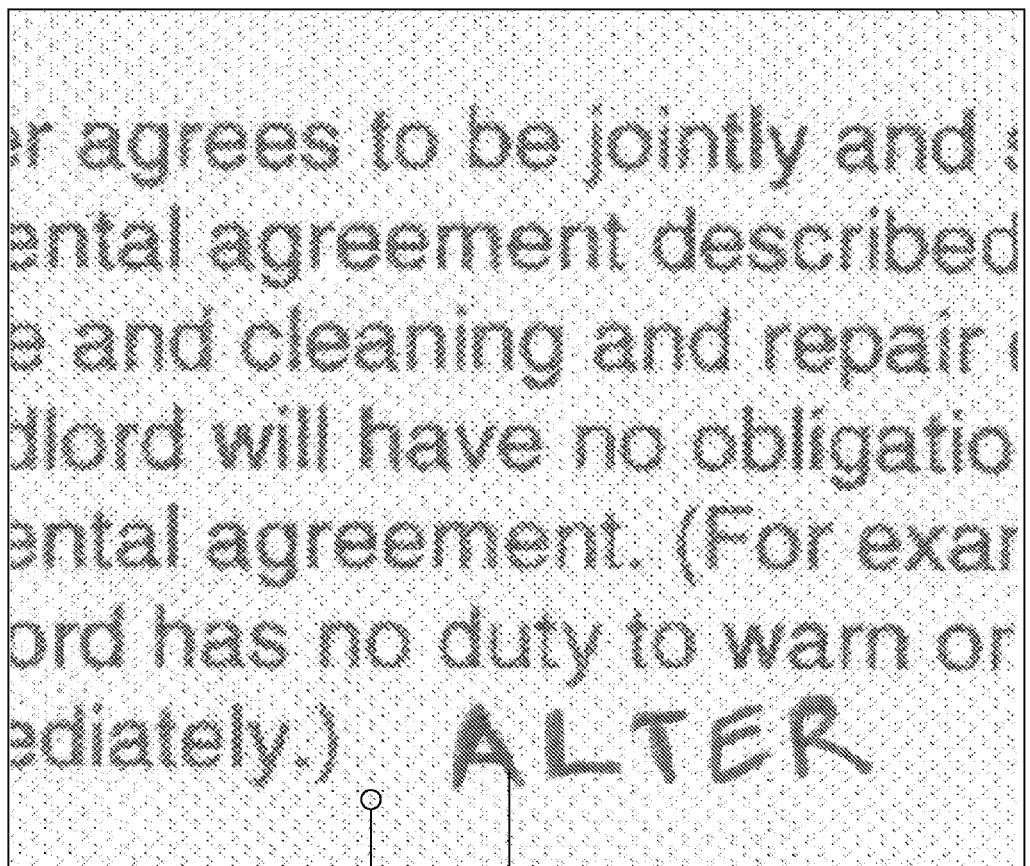
Fig. 2    22    24
Fig. 5

DETERMINING DOCUMENT AUTHENTICITY IN A CLOSED-LOOP PROCESS

BACKGROUND OF THE INVENTION

1. Field of the Invention

This invention relates to document management, and in particular, it relates to a method for determining the authenticity of a digital document after it has been printed and then scanned in a closed-loop process.

2. Description of Related Art

A closed-loop process refers to printing an original digital document (which may include text, graphics, images, etc.), using the printed hard copy of the document such as distributing it, copying it, etc., and then scanning a hard copy of the document back into digital form. Authenticating a scanned digital document refers to determining whether the scanned document is an authentic copy of the original digital document, i.e., whether the document has been altered while it was in the hard copy form. Certain proposed method of authenticating a scanned document performs an image comparison of the scanned document with the original digital document. Such a comparison may be difficult to achieve to adequate accuracy due to various distortions to the original digital image during the print and scan process.

SUMMARY

The present invention is directed to a method for authenticating a document that substantially obviates one or more of the problems due to limitations and disadvantages of the related art.

An object of the present invention is to detect alterations to documents in a closed-loop process, i.e., after the document is print and then scanned.

A document authentication method according to embodiments of the present invention eliminates the sole reliance on the method of original digital image and scanned image comparison when detecting image authenticity.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for authenticating a printed document, including: obtaining a digital document image; adding a watermark to the digital document image, the watermark including a pattern of dots, each dot being larger than or equal to one by one pixel as defined by a first spatial resolution; printing the document including the watermark using halftone printing at the first spatial resolution; scanning the printed document at a second spatial resolution equal to or higher than the first spatial resolution to obtain a scanned image; and detecting any alteration in the scanned image by identifying areas within the scanned image containing low pixel intensity variation.

In another aspect, the present invention provides a method for authenticating a printed document, the document having been printed from a digital image using halftone printing at a first spatial resolution, the digital image containing a watermark added to an original digital document image, the watermark including a pattern of dots, each dot being larger than or equal to one by one pixel as defined by the first spatial resolution, the method including: scanning the printed document at a second spatial resolution equal to or higher than the first spatial resolution to obtain a scanned image; and detecting any alteration in the scanned image by identifying areas within the scanned image containing low pixel intensity variation.

In another aspect, the present invention provides a computer program product that causes a data processing apparatus to perform the above methods.

In yet another aspect, the present invention provides a data processing system, which includes: a scanning section for scanning a printed document to generate a scanned image, the printed document having been printed from a digital image using halftone printing at a first spatial resolution, the digital image containing a watermark added to an original digital document image, the watermark including a pattern of dots being larger than or equal to one by one pixel as defined by the first spatial resolution, wherein the scanner scans the printed document at a second spatial resolution equal to or higher than the first spatial resolution; and a processing section for processing the scanned image to detecting any alteration therein by identifying areas within the scanned image containing low pixel intensity variation.

It is to be understood that both the foregoing general description and the following detailed description are exemplary and explanatory and are intended to provide further explanation of the invention as claimed.

BRIEF DESCRIPTION OF THE DRAWINGS

FIG. 2 is an enlarged view of an area of a scanned image generated by scanning back the watermarked document.

FIG. 5 shows an example of the result of alteration detection.

DETAILED DESCRIPTION OF PREFERRED EMBODIMENTS

Figures 1A, 1B:
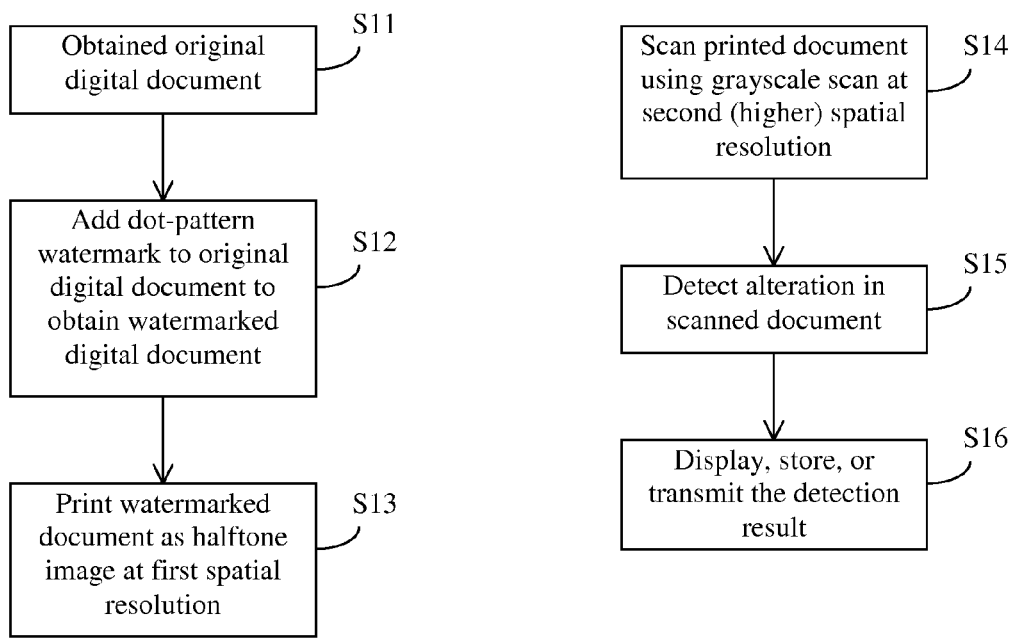
FIGS. 1A and 1B illustrates an overall process of document authentication according to an embodiment of the present invention.

A document authentication method according to embodiments of the present invention uses a watermark that is added to the digital image as well as printer halftone information to accomplish detection of alterations in the printed document. The overall process of the authentication method is shown in FIGS. 1A and 1B. First, an original digital document is obtained (step S11). In this disclosure, unless otherwise specified, a digital document refers to a digital image as opposed to, for example, a text based document. Step S11 may be done by scanning a printed document, generating the digital document from digital data using a computer program, receiving the digital document from another electronic source, etc. The document is converted into a format that allows image manipulation, if it is not already in such a format. If the document is scanned from a printed document, a grayscale scan as opposed to a black and white scan is used so that the scanned digital document is a grayscale image. Then, a visible watermark in the form of a regularly arranged dot pattern covering substantially the entire area of the document is overlapped with the original digital document to create a watermarked image of the original digital document (step S12). The size of the dots is 1 by 1 pixels or larger where the pixels are defined by a first spatial resolution, such as 300 dpi. Alternatively, the dots in the watermark may be irregularly arranged as long as they are sufficiently dense so that each block of image for analysis (described in more detail later) contains a sufficient number of dots. Further, the watermark may cover only a portion of the document, in which case only the portion containing the watermark is later authenticated.

In the following descriptions, unless otherwise specified, an 8-bit grayscale range where 0 is black is used in the various examples. Those skilled in the art will be readily able to apply the methods to a different grayscale range.

When adding the watermark to the original digital document, regions of overlap (i.e. where the dots of the watermark exist) are darkened or lightened to reflect the blend color. In a preferred embodiment, when an original pixel value in a region of overlap is lighter than or equal to an intensity threshold value (i.e. it is located in a relatively light colored or blank area of the original image), it is darkened by a value referred to as the first watermark intensity value. When an original pixel value in a region of overlap is darker than the intensity threshold value (i.e. it is located in an area of the image that has relatively dark content), it is lightened by a value referred to as the second watermark intensity value. The first and second watermark intensity value may be the same or different. In one particular example, the intensity threshold value is 255 (i.e. white), and the first and second watermark intensity values are 51. In an alternative embodiment, pixels in all regions of overlap are darkened regardless of the original pixel value (resulting pixel values exceeding the darkest possible value (0) are set to the darkest pixel value). More generally, the watermark intensity values added or subtracted from the original pixel value may be any suitable function of the original pixel value, with the general goal of generating an image with visible watermark dots in all image areas (both originally dark areas and originally light areas). In addition, the size of the watermark dots may vary depending on the original pixel value. For example, watermark does in very dark areas (lighter toned dots in vary dark areas) may be made larger than gray toned watermark dots in white areas.

This watermarked image is printed out as a halftone image at the first spatial resolution (e.g. 300 dpi) (step S13), and the printed document is used (e.g. distributed, etc.) The printed document carries a visible watermark in the form of a light gray shade.

Later, a detection process shown in FIG. 1B is carried out to determine whether the printed document (carrying the watermark) has been altered since it was printed. First, the printed document is scanned back using a grayscale scan at a second spatial resolution that is higher than the first spatial resolution (step S14). For example, the second resolution may be 600 dpi when the first resolution is 300 dpi. When a grayscale image is converted to a halftones (binary) image during the print process (as in step S13), a gray color is printed as a pattern of black dots (halftone dots), their size (AM—Amplitude Modulated) or spatial frequency (FM—Frequency Modulated) is varied correspondingly to simulate the grayscale value. When the printed halftone image is scanned back using a resolution higher than the resolution at which it was printed (as in step S14), the halftone dots are visible in the scanned image, as shown in FIG. 2. As shown in FIG. 2, which is an enlarged view of an area of a scanned image generated by step S14, clusters of halftone dots can be seen in the "white" areas of the image, where each cluster (e.g. 22 in FIG. 2) corresponds to a gray dot in the watermark. Note that the effect of the watermark dots is also present in the "black" areas of the scanned image (e.g., where text is present).

FIG. 2 also illustrates an area 24 where the printed document was altered between the print (step S13) and scan (step S14), in this particular example, by adding the text "ALTER" with a dark pen. It can be observed that in the scanned-back image, the altered areas (the strokes in the altered text) are relatively "flat", meaning the pixel intensity within the altered areas vary by relatively small amounts. In contrast, in areas of the image that have not been altered, relatively large density variation exists in both "white" areas (these correspond to the white areas of the original document image before the watermark was added) and gray or black areas (e.g. where text or other image elements are present). The relatively large density variation is due to the fact that watermark dots have been added to the image and that the image was printed with a halftone printer at a lower resolution. The alteration detection step (step S15) detects alternations by identifying flat areas (i.e. areas containing low intensity variation) within the image. It uses a combination of flat block detection and additional multiple threshold method for robust alteration detection. This step can detect and identify alterations and separate them from the document. FIG. 5 illustrates an example of the result of step S15, where the alterations are separated from the original document (note that FIG. 5 is a only portion of the image in FIG. 2).

Figure 3:
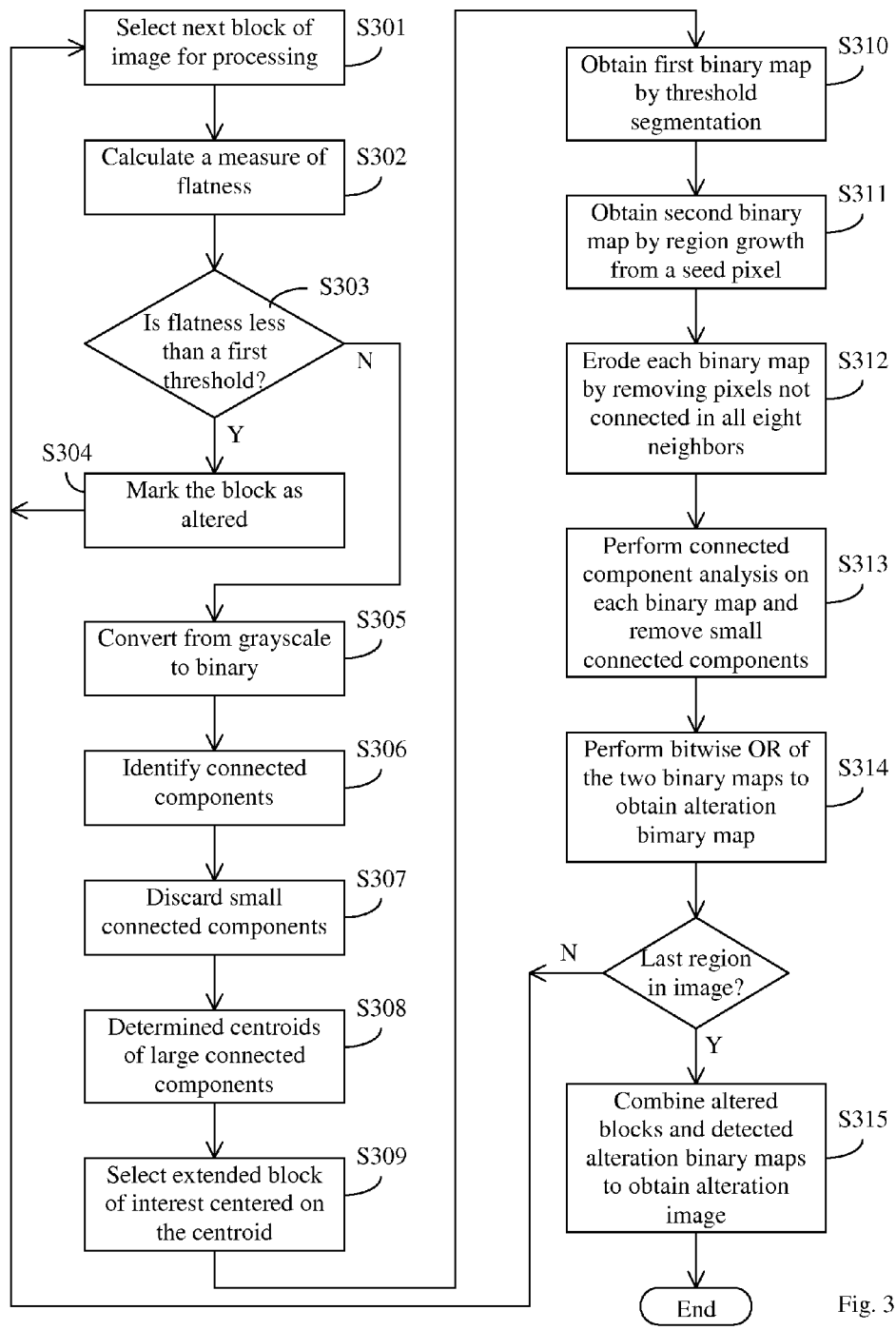
FIG. 3 is a flowchart illustrating a method for detecting alterations in a printed document according to an embodiment of the present invention.

The alteration detection algorithm used in step S15 is described below with reference to the flowchart shown in FIG. 3. The detection algorithm first selects a block of the image for processing (step S301). The block may be selected by dividing the image into a plurality of tiles each of a predetermined size (e.g., 16×16 pixels in the illustrated example). For each block, a measure of "flatness" is calculated based on pixel intensities in the block (step S302). In the preferred embodiment, the measure of flatness is defined as the difference between the maximum pixel intensity and the minimum pixel intensity in the block. Other alternative measure of flatness may be used, such as standard deviation, variance, etc. If the measure of flatness is equal to or below a first predetermined threshold ("Y" in step S303), the entire block is marked as altered (step S304) and the process continues to the next block. In a preferred embodiment, the first predetermined threshold is 1. If the block is not determined to be flat ("N" in step S303), then the block is further processed in steps S305 to S314 to determine whether a portion of it is flat. The flat portion is considered altered areas.

Figure 4A:
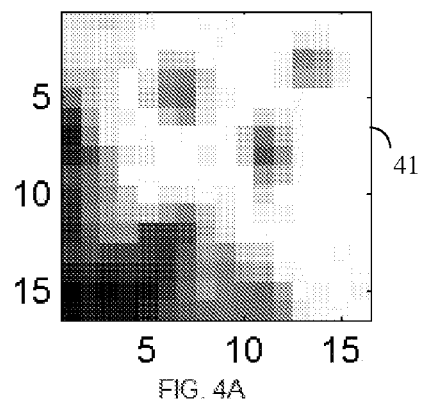
FIGS. 4A-4L illustrate examples of various steps of the method for detecting alterations of FIG. 3.
Figure 4B:
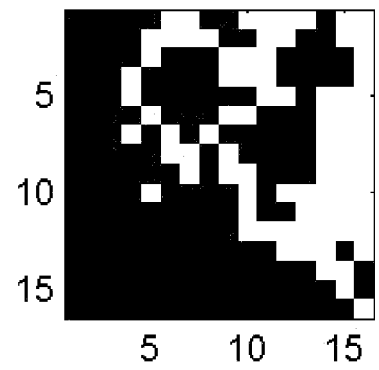
Figure 4C:
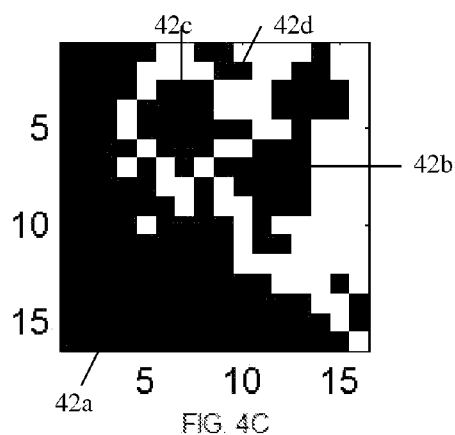
Figure 4D:
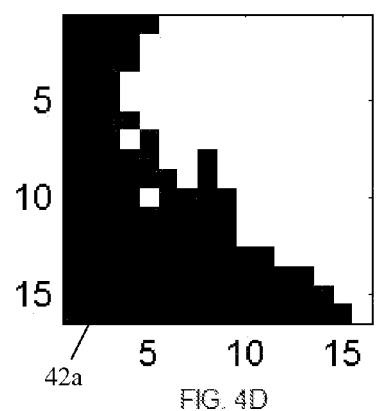

Steps S305 to S314 are explained with reference to the example shown in FIGS. 4A-4L. FIG. 4A shows a block 41 having 16×16 pixels, each pixel having a grayscale value. First, a grayscale to binary conversion is performed for each pixel using a second predetermined threshold (step S305). In a preferred embodiment, the second predetermined threshold is 250. FIG. 4B shows the block having been converted to binary values. Then, a connected component analysis is performed where pixels adjacent to one another with the same value are labeled as a connected component (step S306). FIG. 4C illustrates a number of connected components 42a, 42b, 42c, etc. identified in step S306. Each connected component having a pixel count larger than or equal to a third predetermined threshold is labeled as a perspective candidate for alteration and its centroid is determined (step S308), while connected components having a pixel count less than the third threshold are discarded (step S307). In a preferred embodiment, the third predetermined threshold is 81. FIG. 4D illustrates a perspective candidate 42a, the smaller connected components 42b, 42c, etc. seen in FIG. 4C having been discarded.

Figure 4E:
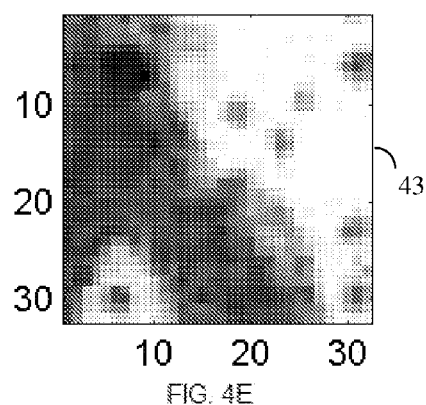
Figure 4F:
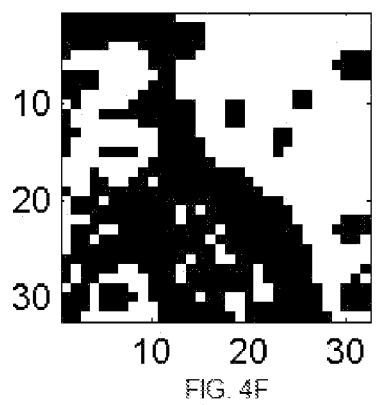
Figure 4G:
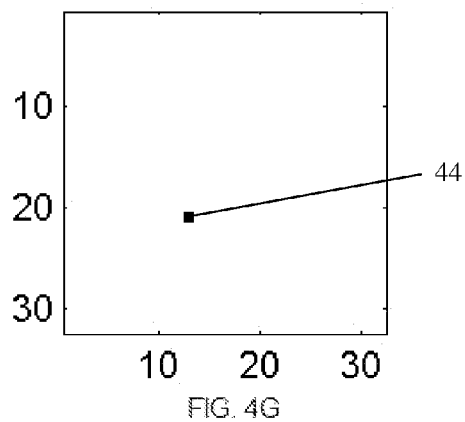
Figure 4H:
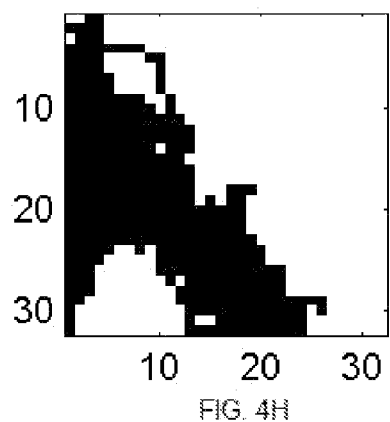
Figure 4I:
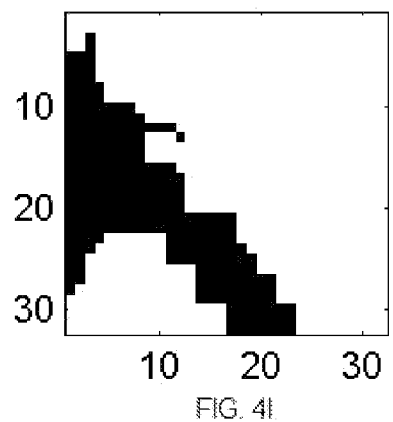
Figure 4J:
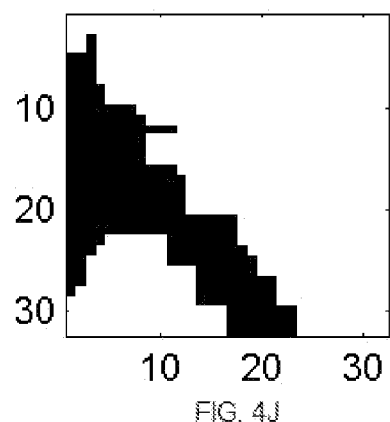
Figure 4K:
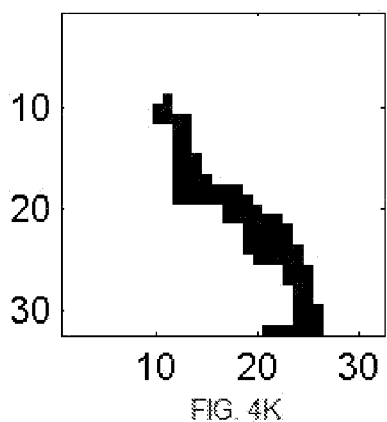
Figure 4L:
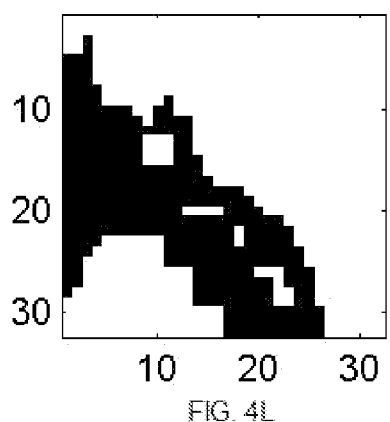

For each perspective candidate for alteration, an extended block of interest for which the determined centroid acts as its center is selected (step S309). In a preferred embodiment, a size of 32×32 pixels is used for the extended block of interest. FIG. 4E illustrates the extended block of interest 43, whose center is the centroid of the candidate 42a in FIG. 4D. This extended block of interest 43 is then processed to obtain two binary maps representing the alteration detection result. The first binary map is obtained by threshold segmentation (step S310) whereby pixels having intensities falling within a predetermined range are marked as 1 or "on". In a preferred embodiment, the predetermined range is between the minimum pixel intensity plus a predetermined fraction of the total intensity range and the maximum pixel intensity minus the predetermined fraction of the total intensity range. The total intensity range is defined as the difference between the maximum pixel intensity and the minimum pixel intensity within the extended block of interest. The predetermined fraction is 1⁄5 in the preferred embodiment. FIG. 4F shows the first binary map where the pixels marked as "on" are shown in black. The second binary map is obtained by region growth from a seed pixel (step S311) whereby each neighboring pixel is compared to the current region mean and added to the region if its difference from the mean is within a tolerance threshold (a fourth predetermined threshold). In a preferred embodiment, the fourth predetermined threshold is 25% of the mean. The seed pixel chosen is the pixel with the minimum value (i.e. the darkest pixel) in the current connected component of interest (i.e. candidate 42a) part of the block before the extension (i.e. the 16×16 block). During the region growth process, pixels larger than 250 is not considered to prevent the growth of a region into the background white areas. FIG. 4G shows the seed pixel 44, and FIG. 4H shows the second binary map as the result of region growth from the seed pixel where the region is shown in black. Each of these two binary maps is then eroded whereby pixels not connected in all 8 neighbors are removed (step S312). FIG. 4I shows the second eroded binary map, i.e., the result of region erosion for the second binary map. Next, a connected component analysis is conducted on each of the two eroded binary maps and connected components with pixel counts less than a fifth predetermined threshold are removed (step S313). In a preferred embodiment, the fifth predetermined threshold is 81 pixels. Step S313 results in first and second detected alteration binary maps from the first and second eroded binary maps. FIGS. 4k and 4J show the first and second detected alteration binary maps, respectively. A bitwise OR operation is conducted on the first and second detected alteration binary maps (step S314) to obtain the final detected alteration binary map where pixels that are "on" or 1 indicate altered pixels. FIG. 4L shows the final detected alteration binary map. Steps S302 to S314 are repeated for each block until the entire image is processed. Finally, all blocks that are marked as altered in step S304 and all alteration binary maps obtained in step S314 are combined (step S315) to generate an alteration image that contains the alterations in the printed document (see FIG. 5).

Referring back to FIGS. 1A and 1B, the steps for generating a printed document carrying a watermark (i.e. steps S11 to S13) and the steps of detecting alterations in a printed document carrying a watermark (i.e. steps S14 and S15) do not have to be performed by the same person or at the same location. In other words, one person can perform the printing steps without regard to whether or how the alteration detection steps will be performed, so long as the watermark is adequately added, and another person can perform the alternation detection steps without regard to the origin of the printed document, so long as the printed document carries an adequate watermark and the scanning is done at a higher spatial resolution than the resolution at which the document was printed. The step of adding a watermark (step S12) may be performed by any data processing device with adequate processing capabilities, such as a computer, a printer, an all-in-one (AIO) device that combines printing, scanning and copying functions, etc. Likewise, the step of detecting alterations (step S15) may be performed by any data processing device with adequate processing capabilities, such as a computer, a scanner, and AIO, etc. The result of the alteration detection step, which may be in the form of an image showing the alterations (e.g., as illustrated in FIG. 5), may be displayed to a user, stored, transmitted to another data processing device, or otherwise used by a user (step S16 in FIG. 1B).

Figure 6A:
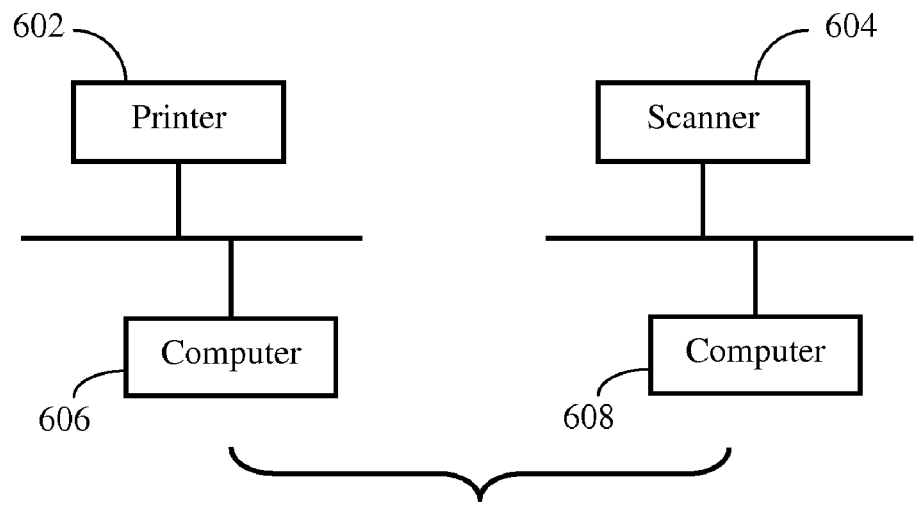
FIG. 6 illustrates a data processing system
Figure 6B:
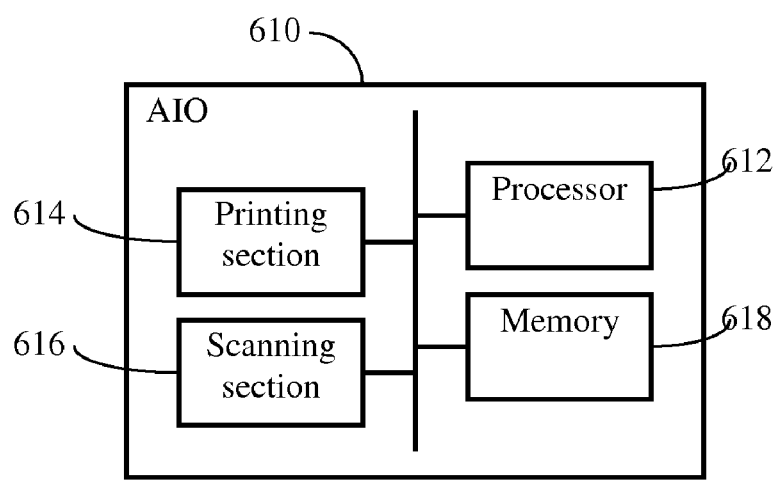

FIG. 6A schematically illustrates a data processing system in which an authentication method according to embodiments of the present invention may be implemented. The data processing system includes a printer 602 connected to a computer 606, and a scanner 604 connected to a computer 608. The printer 602 and scanner 604 each include standard hardware and software components familiar to those skilled in the relevant art and detailed descriptions of them are omitted here. The process of adding a watermark (step S12 in FIG. 1A) may be performed by the computer 606 or a processor in the printer 602. The process of detecting alteration (step S15 in FIG. 1B) may be performed by the computer 608 or a processor in the scanner 604. FIG. 6B schematically illustrates an all-in-one device (AIO) in which an authentication method according to embodiments of the present invention may be implemented. The AIO 610 (also referred to as a multifunction device) is a device that includes both a printing section 614 and a scanning section 616 and can perform printing, scanning and copying functions. The process of adding a watermark and/or the process of detecting alterations may be performed by the processor 612 of the AIO or a computer connected to the AIO (not shown).

In preferred embodiments, the resolution at which the watermarked document is scanned back is higher than the resolution at which the watermarked document is printed. Alternatively, the scan resolution may be the same as the print resolution, but it would require the original digital image intensity to be lightened or the original image resolution to be reduced. By doing so, the halftone dots can still be visible even if not scanned at a higher resolution. Such measures, however, tend to reduce the image quality of the printed document and are not preferred.

The alteration detection method described above can be applied even when the printed document is copied before it is altered, as long as the copying preserves the halftone nature of the printed document or is itself a halftone image generated by the printer. If the printed document is copied after it is altered, the applicability of the alternation detection method would depend on the way the copier manipulates the image when copying.

It will be apparent to those skilled in the art that various modification and variations can be made in the method for detecting alterations in a printed document according to the present invention without departing from the spirit or scope of the invention. Thus, it is intended that the present invention cover modifications and variations that come within the scope of the appended claims and their equivalents.

What is claimed is:

1. A method for authenticating a printed document, comprising:
   obtaining a digital document image;
   adding a watermark to the digital document image, the watermark including a pattern of dots, each dot being larger than or equal to one by one pixel as defined by a first spatial resolution, wherein the adding step includes, for each pixel within a dot of the watermark, adding a first watermark intensity value to or subtracting a second watermark intensity value from an original pixel value of the pixel in the digital document image depending on the original pixel value;

printing the document including the watermark using halftone printing at the first spatial resolution;

scanning the printed document at a second spatial resolution equal to or higher than the first spatial resolution to obtain a scanned image; and detecting any alteration in the scanned image by identifying areas within the scanned image containing low pixel intensity variation.

2. The method of claim 1, wherein the detecting step comprises:

(a) dividing the scanned image into a plurality of blocks each having a plurality of pixels;

for each block, (b) calculating a measure of flatness of the block; and (c) marking the block as altered if the measure of flatness is equal to or below a first predetermined threshold;

for each block not marked as altered, (d) performing a grayscale to binary conversion for each pixel in the block using a second predetermined threshold;

(e) performing a first connected component analysis to obtain one or more connected components;

(f) for each connected component having a pixel count larger than or equal to a third predetermined threshold, selecting an extended block of interest centered on a centroid of the connected component and generating an alteration binary map in the extended block of interest representing alternations in the printed document; and (g) combining all blocks marked as altered in step (c) and all alteration binary maps generated in step (f) to generate an alteration image.

3. The method of claim 2, wherein step (f) comprises:

(f1) generating a first binary map by threshold segmentation wherein pixels having intensities falling within a predetermined range are marked as on;

(f2) generating a second binary map by region growth from a seed pixel, the seed pixel being the darkest pixel in the extended block of interest, wherein each neighboring pixel is compared to a mean of a current region and added to the region if its difference from the mean is within a fourth threshold;

(f3) eroding the first and second binary map by removing pixels not connected in all eight neighbors to generate first and second eroded binary maps, respectively;

(f4) performing a second connected component analysis on each of the first and second eroded binary maps and removing connected components with pixel counts less than a fifth predetermined threshold to obtain first and second detected alteration binary maps; and (f5) bitwise ORing the first and second detected alteration binary maps to obtain the alteration binary map.

4. A method for authenticating a printed document, the document having been printed from a digital image using halftone printing at a first spatial resolution, the digital image containing a watermark added to an original digital document image, the watermark including a pattern of dots, each dot being larger than or equal to one by one pixel as defined by the first spatial resolution, wherein for each pixel within a dot of the watermark, a pixel value of the pixel has been calculated by adding a first watermark intensity value to or subtracting a second watermark intensity value from an original pixel value of the pixel in the original digital document image depending on the original pixel value; the method comprising:

scanning the printed document at a second spatial resolution equal to or higher than the first spatial resolution to obtain a scanned image; and detecting any alteration in the scanned image by identifying areas within the scanned image containing low pixel intensity variation.

5. The method of claim 4, wherein detecting step comprises:

(a) dividing the scanned image into a plurality of blocks each having a plurality of pixels;

for each block, (b) calculating a measure of flatness of the block; and (c) marking the block as altered if the measure of flatness is equal to or below a first predetermined threshold;

for each block not marked as altered, (d) performing a grayscale to binary conversion for each pixel in the block using a second predetermined threshold;

(e) performing a first connected component analysis to obtain one or more connected components;

(f) for each connected component having a pixel count larger than or equal to a third predetermined threshold, selecting an extended block of interest centered on a centroid of the connected component and generating an alteration binary map in the extended block of interest representing alternations in the printed document; and (g) combining all blocks marked as altered in step (c) and all alteration binary maps generated in step (f) to generate an alteration image.

6. The method of claim 5, wherein step (f) comprises:

(f1) generating a first binary map by threshold segmentation wherein pixels having intensities falling within a predetermined range are marked as on;

(f2) generating a second binary map by region growth from a seed pixel, the seed pixel being the darkest pixel in the extended block of interest, wherein each neighboring pixel is compared to a mean of a current region and added to the region if its difference from the mean is within a fourth threshold;

(f3) eroding the first and second binary map by removing pixels not connected in all eight neighbors to generate first and second eroded binary maps, respectively;

(f4) performing a second connected component analysis on each of the first and second eroded binary maps and removing connected components with pixel counts less than a fifth predetermined threshold to obtain first and second detected alteration binary maps; and (f5) bitwise ORing the first and second detected alteration binary maps to obtain the alteration binary map.

7. A computer program product comprising a computer usable medium having a computer readable program code embedded therein for controlling a data processing apparatus, the computer readable program code configured to cause the data processing apparatus to execute a process for authenticating a scanned image obtained by scanning a printed document, the printed document having been printed from a digital image using halftone printing at a first spatial resolution, the digital image containing a watermark added to an original digital document image, the watermark including a pattern of dots being larger than or equal to one by one pixel as defined by the first spatial resolution, the scanning having been performed at a second spatial resolution equal to or higher than the first spatial resolution, the process comprising:
- (a) dividing the scanned image into a plurality of blocks each having a plurality of pixels;

for each block,
- (b) calculating a measure of flatness of the block; and
- (c) marking the block as altered if the measure of flatness is equal to or below a first predetermined threshold;

for each block not marked as altered,
- (d) performing a grayscale to binary conversion for each pixel in the block using a second predetermined threshold;
- (e) performing a first connected component analysis to obtain one or more connected components;
- (f) for each connected component having a pixel count larger than or equal to a third predetermined threshold, selecting an extended block of interest centered on a centroid of the connected component and generating an alteration binary map in the extended block of interest representing alternations in the printed document; and
- (g) combining all blocks marked as altered in step (c) and all alteration binary maps generated in step (f) to generate an alteration image.

8. The computer program product of claim 7, wherein step (f) comprises:
- (f1) generating a first binary map by threshold segmentation wherein pixels having intensities falling within a predetermined range are marked as on;
- (f2) generating a second binary map by region growth from a seed pixel, the seed pixel being the darkest pixel in the extended block of interest, wherein each neighboring pixel is compared to a mean of a current region and added to the region if its difference from the mean is within a fourth threshold;
- (f3) eroding the first and second binary map by removing pixels not connected in all eight neighbors to generate first and second eroded binary maps, respectively;
- (f4) performing a second connected component analysis on each of the first and second eroded binary maps and removing connected components with pixel counts less than a fifth predetermined threshold to obtain first and second detected alteration binary maps; and
- (f5) bitwise ORing the first and second detected alteration binary maps to obtain the alteration binary map.

9. A data processing system, comprising:
- a scanning section for scanning a printed document to generate a scanned image, the printed document having been printed from a digital image using halftone printing at a first spatial resolution, the digital image containing a watermark added to an original digital document image, the watermark including a pattern of dots being larger than or equal to one by one pixel as defined by the first spatial resolution, wherein for each pixel within a dot of the watermark, a pixel value of the pixel has been calculated by adding a first watermark intensity value to or subtracting a second watermark intensity value from an original pixel value of the pixel in the original digital document image depending on the original pixel value, wherein the scanner scans the printed document at a second spatial resolution equal to or higher than the first spatial resolution; and
- a processing section for processing the scanned image to detecting any alteration therein by identifying areas within the scanned image containing low pixel intensity variation.

10. The data processing system of claim 9, wherein the processing section carries out an alteration detection process that comprises:
- (a) dividing the scanned image into a plurality of blocks each having a plurality of pixels;

for each block,
- (b) calculating a measure of flatness of the block; and
- (c) marking the block as altered if the measure of flatness is equal to or below a first predetermined threshold;

for each block not marked as altered,
- (d) performing a grayscale to binary conversion for each pixel in the block using a second predetermined threshold;
- (e) performing a first connected component analysis to obtain one or more connected components;
- (f) for each connected component having a pixel count larger than or equal to a third predetermined threshold, selecting an extended block of interest centered on a centroid of the connected component and generating an alteration binary map in the extended block of interest representing alternations in the printed document; and
- (g) combining all blocks marked as altered in step (c) and all alteration binary maps generated in step (f) to generate an alteration image.

11. The data processing system of claim 10, wherein step (f) comprises:
- (f1) generating a first binary map by threshold segmentation wherein pixels having intensities falling within a predetermined range are marked as on;
- (f2) generating a second binary map by region growth from a seed pixel, the seed pixel being the darkest pixel in the extended block of interest, wherein each neighboring pixel is compared to a mean of a current region and added to the region if its difference from the mean is within a fourth threshold;
- (f3) eroding the first and second binary map by removing pixels not connected in all eight neighbors to generate first and second eroded binary maps, respectively;
- (f4) performing a second connected component analysis on each of the first and second eroded binary maps and removing connected components with pixel counts less than a fifth predetermined threshold to obtain first and second detected alteration binary maps; and
- (f5) bitwise ORing the first and second detected alteration binary maps to obtain the alteration binary map.

* * * * *